United States Patent [19]

Kyogoku et al.

[11] 4,369,454

[45] Jan. 18, 1983

[54] RECORDING APPARATUS

[75] Inventors: Hiroshi Kyogoku, Kawasaki; Koji Terasawa, Fuchu, both of Japan

[73] Assignee: Canon Kabushiki Kaisha, Tokyo, Japan

[21] Appl. No.: 107,938

[22] Filed: Dec. 28, 1979

[30] Foreign Application Priority Data

Jan. 24, 1979 [JP] Japan .................................. 54-7565

[51] Int. Cl.$^3$ .............................................. G01D 15/18

[52] U.S. Cl. ................................................. 346/140 R

[58] Field of Search .................................. 346/140, 75

[56] References Cited

U.S. PATENT DOCUMENTS 3,346,869 10/1967 Stone .................................... 346/75

4,045,802 8/1977 Fukazawa .......................... 346/140

4,112,435 9/1978 Kattner .............................. 346/140

4,144,537 3/1979 Kimura .............................. 346/140

*Primary Examiner*—Joseph W. Hartary

*Attorney, Agent, or Firm*—Fitzpatrick, Cella, Harper & Scinto

[57] ABSTRACT

A recording apparatus is disclosed which is improved in operability by linking a printing head protection device with a switch mechanism. The printing head comprises an ink jet head and the switch mechanism comprises a power source switch, print switch etc.

3 Claims, 2 Drawing Figures

RECORDING APPARATUS

BACKGROUND OF THE INVENTION

1. Field of the Invention

The present invention relates generally to recording apparatus and more particularly to such recording apparatus in which means for protecting the printing head and the switch mechanism are in linkage with each other.

2. Description of the Prior Art

Printing heads such as thermal head, ink jet head and discharge printing needle are apt to get dirty and deteriorated. Therefore, it is a common practice in the art to provide means for protecting the printing head in a recording apparatus. Such protecting means is manually removed prior to the start of printing operation. This puts the operator to trouble. Also, prior to the start of a printing operation, the operator generally has to turn on the power source switch, print mode setting switch and the like.

SUMMARY OF THE INVENTION

Accordingly, it is an object of the present invention to provide a recording apparatus which is easy to operate.

It is still more specific object of the invention to improve the operability of such recording apparatus by linking the motion for applying and removing a printing head protection means with the On-Off operation of a switching mechanism for a power source switch, print switch or the like.

Other and further objects, features and advantages of the invention will appear more fully from the following description taken in connection with the accompanying drawing.

DESCRIPTION OF THE PREFERRED EMBODIMENTS

Figure 1:
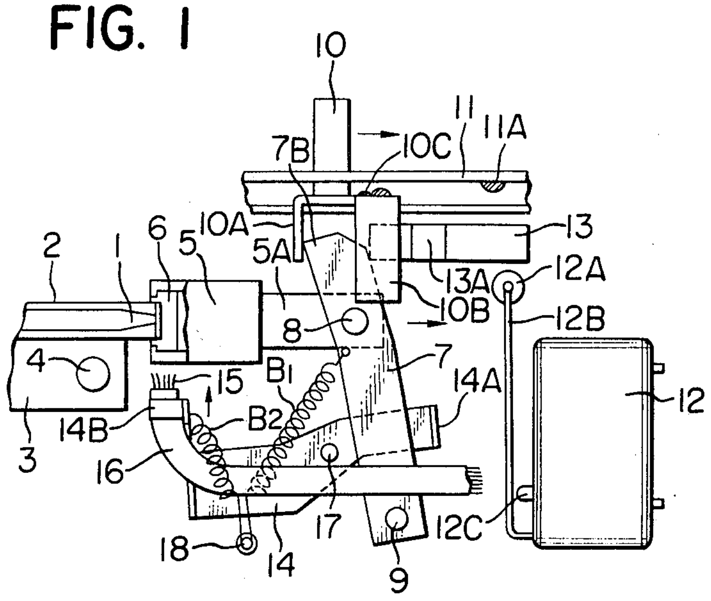
FIG. 1 is a sectional view of the essential part of a recording apparatus showing an embodiment of the invention, with its printing head being shown in a protected position.

Referring first to FIG. 1 there is shown a preferred embodiment of the invention. Designated by 1 is an ink jet head, 2 is a jacket surrounding the head and 3 is a carriage carrying thereon the head 1. The carriage 3 is movable along a shaft 4. Designated by 5 is a head protection cover having, at its fore end, a rubber member 6. The shank portion 5A of the protection cover 5 is engaged with a lever 7 through a pin 8. The lever 7 is rotatable about a pivot 9 and is under the action of a spring 18 one end of which is fastened to the lever at 7A. The free end portion 7B of the lever 7 is in contact with an extension part 10A of a knob 10. By moving the knob 10 rightward and leftward as suggested by an arrow, a casing 11 provided for the main body of the apparatus is moved to turn on and off a switch which is, in the shown embodiment, a power source switch.

Figure 2:
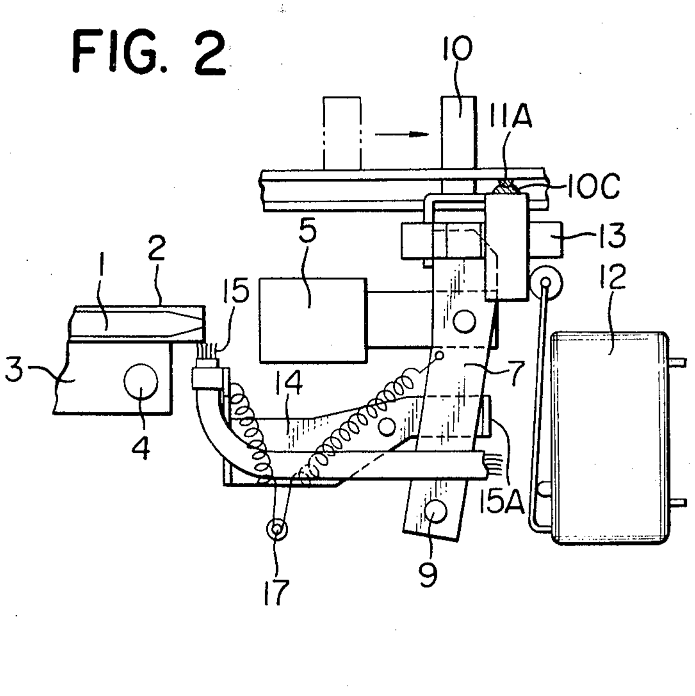
FIG. 2 is a similar view showing the printing head in an unprotected position.

In the position of the apparatus shown in FIG. 1, the power source switch is in its Off-position and the protection cover 5 is in its effective position in which the rubber member 6 caps the head 1 for protecting the latter. This prevents the tip of the ink jet head from being dried, blocked and made dirty by paper dirt and dust. To initiate the operation of the apparatus which may be a miniature calculator or a cash register, the operator moves the knob 10 rightward against the force of spring B1. Since an electrode 10C is provided on a member 10B formed integrally with the knob 10, the rightward movement of the knob brings the electrode 10C into contact with another electrode 11A provided on the casing 11. Thus, the power source is turned on. This position is shown in FIG. 2.

The knob 10 may be a print mode setting knob provided to operate a printer. In this case, a print mode setting signal will be issued when the electrode 10C comes into contact with the other electrode 11A. The signal thus formed is to be introduced in the main part of the printer. Another mode setting knob also may be used as the knob 10. As illustrated in the shown embodiment, the operational motion of the knob 10 may be used to actuate another switch 12. When the knob 10 is moved rightward by the operator, a roller 12A of the switch 12 is pushed down so that an electrode 12B connected with the roller is brought into contact with another electrode 12C of the switch 12. Thus, there is issued an On-signal which can be used for various purposes.

At the same time when the knob's member 10B passes a projected portion 13A of a click member 13, the knob 10 stops. Since, as previously mentioned, the extension 10A of the knob 10 is in contact with the free end of the lever 7, the above described rightward movement of the knob causes also the lever to rotate clockwise about the pivot 9. Therefore, the protection cover 5 whose shank portion 5A is engaged with the lever 7 by means of pin 8, is also moved in the direction away from the head 1. Thus, the head 1 gets uncapped and ready for use (FIG. 2). Now, printing is effected while the carriage 3 is moved along the shaft 4. The lever 7 comes into engagement with one end 14A of another lever 14 in the position shown in FIG. 2. The other end 14B of the lever 14 is connected with a wire tube 16 containing a number of wires 15. The lever 14 is rotatable about a pivot 17. Therefore, with the clockwise rotation of the lever 7, the lever 14 also rotates clockwise about the pivot 17 due to the one end 14A of the lever 14 being in engagement with the lever 7. As a result, the other end 14B is moved upward together with the wire tube 16 and the wires 15 come into contact with the jacket 2 of the head 1 as seen in FIG. 2. The function of wires 15 is to absorb ink flowing out of the tip of the head 1 and deliver the ink into an ink tank provided at the other end of the wire tube. The ink tank is not shown in the drawing.

Contact between the jacket 2 and wires 15 can be adjusted as desired, for example, when the carriage 3 is in its home position after printing. Provision of such wires 15 has the effect of preventing the head 1, jacket 2 and other members from becoming dirty. Therefore, it is preferably used to effectively protect the ink jet head.

After completing one operation using the register or printer, the operator moves the knob 10 leftward. The knob is returned to its starting position shown in FIG. 1 passing over the projected portion 13A of the click member 13. Now, the lever 7 is rotated counter-clockwise by the force of spring B1 and thereby the protection cover 5 is moved back leftward to the position in which the rubber member 6 is in contact with the head 1 and again caps the latter for protection.

Also, under the action of spring B2 the lever 14 is rotated counter-clockwise and therefore the wires 15 are moved downward away from the jacket 2 of the head to the position shown in FIG. 1.

As will be understood from the foregoing, according to the present invention it is no longer necessary for the operator to manually and separately operate the printing head protection means and the switch mechanism for power source or another switch. Since the protection means and the switch mechanism are in linkage with each other, only one single manual operation is required to move the two separate members. This arrangement assures a more convenient and easier operation of the apparatus for the operator.

While the invention has been particularly shown and described with reference to a preferred embodiment thereof, it will be understood by those skilled in the art that the foregoing and other changes in form and details can be made therein without departing from the spirit and scope of the invention.

What we claim is:

1. A recording apparatus, comprising:

a printing head;

switch means for activating and deactivating said printing head;

protective covering means movable between a first position wherein it covers said printing head and a second position wherein it uncovers said printing head;

mechanical linkage means connecting said switch means and said protective covering means for effecting the covering and uncovering of said printing head in response to the movement of said switch means; and ink collection means for collecting excess ink ejected by said printing head, wherein said linkage means includes means for transporting said ink collection means between an operative position adjacent to said printing head and an inoperative position displaced from said printing head in accordance with the movement of said switch means.

2. A recording apparatus according to claim 1, wherein said switch means comprises a power source switch.

3. A recording apparatus according to claim 1, wherein said switch means comprises a print selection switch for instructing that printing be commenced.

* * * * *